United States Patent [19]

Timm et al.

[11] 4,108,113

[45] Aug. 22, 1978

[54] METHOD FOR REDUCING CONCENTRATION OF HARMFUL OR OFFENSIVE VAPORS IN THE ATMOSPHERE

[75] Inventors: Edward E. Timm, Beaverton; Donald I. Townsend, Midland, both of Mich.

[73] Assignee: The Dow Chemical Company, Midland, Mich.

[21] Appl. No.: 684,595

[22] Filed: May 10, 1976

[51] Int. Cl.² ............................................. F02B 43/08
[52] U.S. Cl. ..................................... 123/3; 123/2; 123/198 A; 123/32 R; 123/1 A
[58] Field of Search ............... 123/32 R, 1 A, 3, 2, 123/197 A; 60/274, 317; 48/197 A

[56] References Cited

U.S. PATENT DOCUMENTS

| | | | |
|---|---|---|---|
| 3,131,533 | 5/1964 | Vandenberg | 60/274 |
| 3,775,978 | 12/1973 | Body | 60/317 |
| 3,908,606 | 9/1975 | Toyoda et al. | 123/3 |
| 3,972,811 | 8/1976 | Larkins, Jr. et al. | 123/3 |
| 4,002,151 | 1/1977 | Toyoda et al. | 123/1 A |

Primary Examiner—Samuel Feinberg
Attorney, Agent, or Firm—V. Dean Clausen

[57] ABSTRACT

It is common practice to discharge waste vapors from certain chemical processes into the atmosphere. Many of these vapors, usually referred to as "vent gases", contain compounds which are considered to be pollutants in the atmosphere. In this invention the vent gases are oxidized in the combustion chamber of a Diesel engine before release to the atmosphere. The oxidation step reduces the concentration of noxious compounds in the vapor to a level acceptable for atmospheric discharge.

2 Claims, 1 Drawing Figure

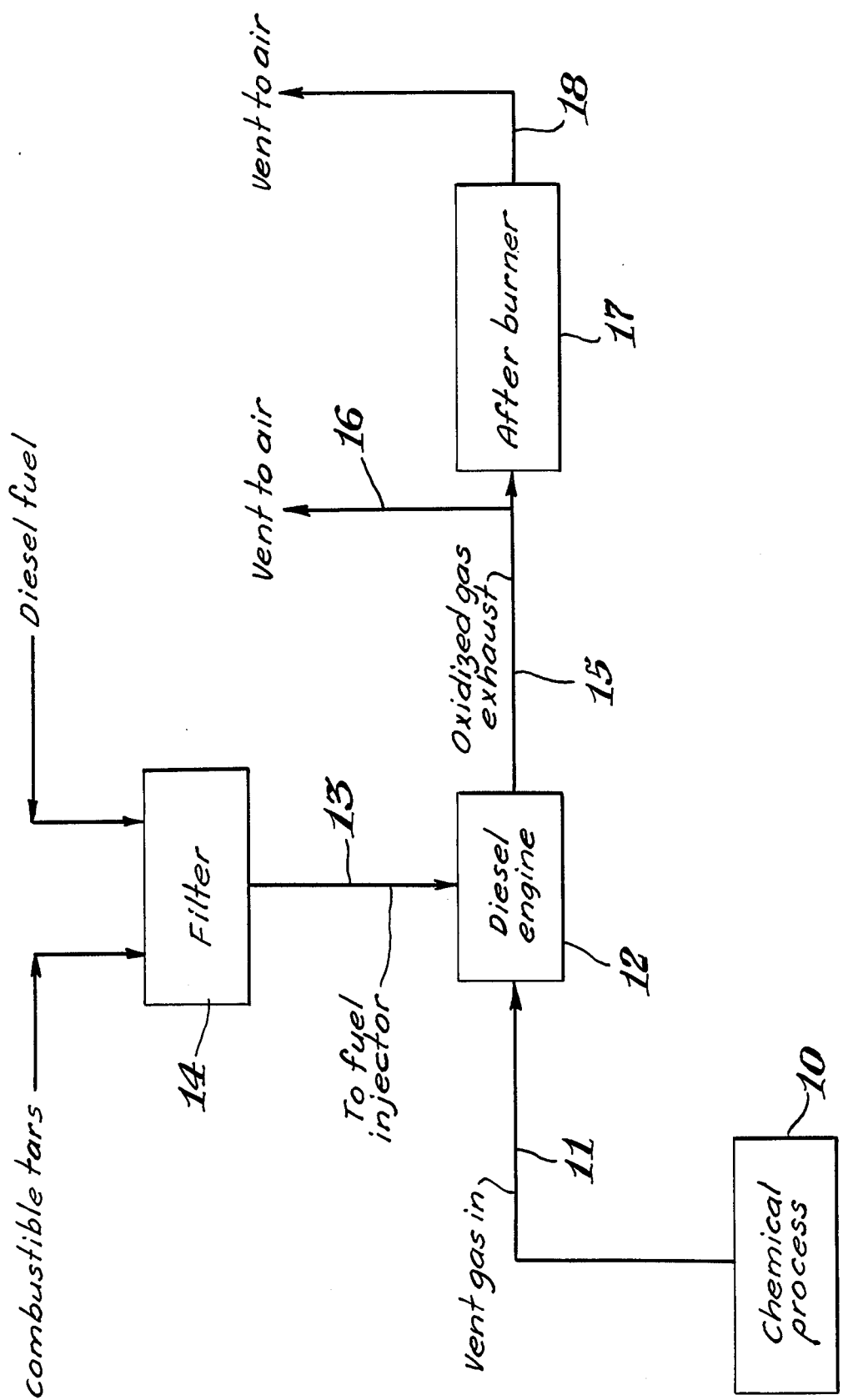

METHOD FOR REDUCING CONCENTRATION OF HARMFUL OR OFFENSIVE VAPORS IN THE ATMOSPHERE

BACKGROUND OF THE INVENTION

Broadly, the invention relates to a method for reducing the concentration of harmful or offensive components in waste vapors which are discharged into the atmosphere. More specifically, the invention is directed to a method in which waste vapors are oxidized in a Diesel engine prior to release into the atmosphere.

In the manufacture of certain chemicals waste vapors are continuously derived which are harmful or offensive to human and animal life. These waste vapors are frequently referred to as "vent gases", since it is common practice to discharge the vapors to the atmosphere through vent openings in storage containers, reactors, pipe lines, and other structures. Because it is undesirable to release such vapors to the atmosphere, the chemical industry is constantly seeking other means for disposing of the vapors.

One disposal technique which is widely used is to incinerate the waste vapors in a furnace or a catalytic burner, followed by discharge of the oxidized effluent to the atmosphere. Generally speaking, the oxidation of waste vapors will reduce the concentration of the harmful or offensive components in the effluent discharge.

This procedure, however, has several disadvantages. One drawback is that furnaces require considerable amounts of fuel, so that the energy consumption of a furnace makes the operating cost relatively high. The fuel cost for operating a catalytic burner is also substantial. In addition, catalytic burners have other disadvantages. For example, the catalyst must have specific properties which make it compatible with the waste vapor being burned. If the catalyst does not have the required properties, it may be poisoned by the waste vapor. This situation results in destruction of the catalyst and an inoperative disposal procedure. With regard to both furnaces and catalytic burners, a general problem is that these units produce heat energy, which is difficult to recover for doing additional work.

SUMMARY OF THE INVENTION

According to the method of this invention the waste vapor is made up of a single vapor phase from one substance, or a mixture of vapor phases from more than one substance. In practice, the waste vapor is first mixed with air in a quantity sufficient to provide a combustible vapor-air mixture. The vapor-air mixture is fed into the combustion chamber of a Diesel engine in operation. On the compression stroke of the engine the gaseous mixture is compressed sufficiently to raise the temperature high enough to ignite the mixture. Toward the end of the compression stroke a fuel, such as Diesel oil, is injected into the combustion chamber to mix with the vapor-air mixture. When ignition temperature is reached, the vapor-air-fuel mixture will spontaneously ignite and oxidize the mixture. On the exhaust stroke of the engine the oxidized vapor mixture is discharged into the atmosphere.

DESCRIPTION OF THE DRAWING

The single FIGURE is a schematic illustration of a typical apparatus layout for oxidizing waste vapors from a chemical process, according to this invention.

DESCRIPTION OF A PREFERRED EMBODIMENT

Referring to the drawing, numeral 10 indicates a chemical process in which harmful or offensive waste vapors are generated. To describe a typical procedure in this invention, assume that the waste vapor being generated is the vapor phase of a liquid substance. Also, assume that the liquid is contained in a storage vessel which has one or more vent openings. From the vessel in process 10 the waste vapor flows through line 11 and into the combustion chamber (not shown) of an operating Diesel engine 12. Line 11 is connected into the air intake (not shown) of the engine, so that the vapor passes through the intake before entering the combustion chamber.

Generally, the waste vapor from process 10 will contain a substantial amount of air, which is picked up during the process. Frequently, the amount of air in the waste vapor phase will be in the proper proportion to make the vapor phase an oxidizable mixture. If the air content is not sufficient to support combustion, extra air is mixed with the waste vapor phase at the air intake of the engine 12.

When the engine 12 is near the end of the compression stroke, a fuel composition is drawn into the combustion chamber of the engine through line 13. Line 13 is connected into an injection nozzle (not shown), through which the fuel passes before entering the combustion chamber. A suitable fuel composition which may be used is a conventional Diesel fuel oil which contains varying amounts of dissolved combustible tars. In the present method it is preferred to pass the fuel composition through a filter apparatus 14 prior to injection into engine 12. This is done to remove particulate matter in the fuel which could clog the fuel injector nozzle in the engine. According to this invention, some waste vapors can be mixed with a Diesel fuel and drawn into the engine 12 through the injection nozzle.

In the combustion chamber of engine 12 the atomized fuel mixes with the incoming waste vapor-air mixture. The entire mixture is then compressed until it spontaneously ignites and oxidizes. On the exhaust stroke of the engine the oxidized waste vapor-air-fuel mixture is discharged into line 15. At this point, if the concentration of harmful or offensive components in the oxidized mixture is reduced to an acceptable level, the waste vapor is vented directly to the atmosphere through vent 16. However, if the concentration of undesirable components is higher than an acceptable level, the waste vapor stream is passed through an incinerator device, such as an after burner, as indicated at 17. After further oxidation in burner 17, the vapor is discharged into the atmosphere through a vent 18.

In practice, most of the commercially available Diesel engines are suitable for the practice of this invention. Specifications for an engine which has been successfully used in this method are described in the example included herein. Broadly, a vapor phase which can be oxidized in the engine of this invention will include any vapor which can be combined with sufficient air to provide an oxidizable mixture. The vapor can be derived from a single liquid, or a single solid substance. The vapor phase can also comprise a mixture of vapors, as derived from more than one substance. Each substance can be one which contains only organic molecules, or only inorganic molecules, or it can be made up a combination of organic and inorganic molecules.

The following organic and inorganic compounds are typical of substances having a vapor phase which can be oxidized in the Diesel burner of this invention:

(1) Aliphatic hydrocarbons, such as methane, ethane, propane, ethylene, propylene, butylene, and alkynes.
(2) Halogen derivatives of aliphatic hydrocarbons, such as vinyl chloride, vinylidene chloride, methylene chloride, methyl bromide, and chloromethyl ether.
(3) Halogen derivatives of aromatic hydrocarbons, such as monochlorobenzene, dichlorobenzene, 2,4-dichlorophenol, and pentachlorophenol.
(4) Aldehydes, such as formaldehyde and acetaldehyde.
(5) Ketones, such as acetone, and methylethyl ketone.
(6) Organic acids, such as acetic acid and acrylic acid; and chlorinated derivatives, such as chloroacetic acid. Organic acid chlorides, such as chloroacetyl chloride and propionyl chloride.
(7) Alcohols and glycols, such as 1-pentanol and propylene glycol.
(8) Amines, such as methylamine, dimethylamine, and triethylamine.
(9) Ethers, such as dimethyl ether, dioxane and tetrahydrofuran.
(10) Esters of organic acids, such as ethyl acetate and methacrylate esters.
(11) Nitriles such as acrylonitrile, acetonitrile, and benzonitrile.
(12) Mercaptans, such as methyl mercaptan and butyl mercaptan.
(13) Molecular acids, such as hydrochloric acid, sulfuric acid, hydrogen sulfide, and nitric acid.
(14) Molecular bases, such as ammonia, sodium hydroxide, and ammonium hydroxide.
(15) Molecular gases, such as hydrogen, chlorine, and phosphine.

Following is an example illustrating the practice of this invention. This example is not intended to limit the invention to the embodiment described herein:

EXAMPLE

Saran is the generic term for a group of commercially available thermoplastic resins. One of these resin compositions is obtained by co-polymerizing vinylidene chloride with vinyl chloride or acrylonitrile. In the manufacture of this product the waste vapors which are generated during the process contain vinylidene chloride and other chlorinated derivatives, such as trichloroethane. Recent studies indicate that compounds of this type may represent undesirable pollution if discharge to the atmosphere is greater than about 25 pounds per day.

The objective in this example is to oxidize the chlorinated vapors prior to release to the atmosphere. Oxidation of the waste vapor converts most of the harmful compounds to other compounds, such as water vapor and carbon dioxide, which are not hazardous when mixed with the atmosphere. Part of the oxidized vapor which is discharged will contain a very low concentration of the harmful compounds. In such small concentrations the harmful compounds in the discharged vapor do not constitute a health hazard when the vapor is mixed with the atmosphere.

To commence this procedure, a sample of waste vapor was collected from vent line 11 at a point ahead of the Diesel engine 12. The vapor sample was analyzed in a mass spectrometer to determine its composition prior to oxidation in the engine. The approximate concentration of the chlorinated compounds in the vapor phase is set out in Table A below.

TABLE A

| Waste Vapor Composition Before Oxidation | |
|---|---|
| Compound | Volume (in pounds per day) |
| 1,1-Vinylidene chloride | 2.368 |
| 1,2-Vinylidene chloride (cis) | 0.350 |
| 1,2-Vinylidene chloride (trans) | 0.583 |
| 1,1,1-Trichloroethane | 0.063 |
| 1,1,2-Trichloroethane | 0.090 |

The vapor composition described in Table A was fed into the combustion chamber of Diesel engine 12. During the compression stroke of the engine, the waste vapor composition is mixed with the fuel composition, which is also injected into the combustion chamber. In the combustion chamber the entire mixture is compressed to about 500 psi. On the power stroke of the engine, the mixture in the combustion chamber will ignite and oxidize at a temperature of about 1000° F.

On the exhaust stroke the oxidized vapor was discharged into line 15. A sample of the oxidized vapor was collected from line 15 at a point ahead of vent line 16. This vapor sample was also analyzed in a mass spectrometer. The approximate composition of the chlorinated compounds in the vapor phase is shown in Table B below.

TABLE B

| Waste Vapor Composition After Oxidation | | |
|---|---|---|
| Compound | Volume (in pounds per day) | Reduction in Concentration (in per cent) |
| 1,1-Vinylidene chloride | 0.371 | 84 |
| 1,2-Vinylidene chloride (cis) | 0.034 | 90 |
| 1,2-Vinylidene chloride (trans) | 0.047 | 92 |
| 1,1,1-Trichloroethane | None | |
| 1,1,2-Trichloroethane | None | |

The data in Table B clearly indicates that oxidation of the chlorinated vapors in a Diesel engine reduces the concentration of the harmful compounds which remain in the vapor discharge. For example, it will be noted that the total concentration of the chlorinated compounds in the vapor discharge is less than 1.0 pound per day. Since the concentration of hazardous compounds is well below the accepted standard, the vapors can be released directly into the atmosphere through vent 16.

There are other situations in which the concentration of hazardous compounds in a waste vapor may still be above an acceptable level after the vapor has been oxidized in the Diesel engine. When this occurs, the oxidized vapor discharged from the engine is passed directly into burner 17. In burner 17 the vapor is further oxidized and then discharged to the atmosphere through vent 18.

Engineering specifications for the engine used in this example are shown in Table C.

TABLE C

| Engine Specifications |
|---|
| Manufacture and Type |
| Onan DJA Diesel engine |
| 4-cycle, single cylinder, vertical design |
| Cylinder bore - 3¼ in. |
| Piston stroke - 3⅝ in. |
| Piston displacement - 30 cu. in. |
| Compression ratio - 19 to 1 |

TABLE C-continued

Engine Specifications

Piston speed - 1087 fpm
Power - 4.7 bhp (maximum) at 1800 rpm
Cooling System
Pressure air cooled
Cooling air volume - 440 cfm at 1800 rpm
Fuel System
Pintle injection nozzle
Combustion air required - 16 cfm

The invention claimed is:

1. A method for reducing the concentration of a halogenated hydrocarbon compound, in a vapor phase of said compound, prior to releasing the vapor phase compound into the atmosphere, the method comprising:

mixing the vapor phase halogenated hydrocarbon compound with a sufficient amount of air to provide an oxidizable vapor phase mixture;

feeding the oxidizable vapor phase mixture into the combustion chamber of a Diesel engine, while the engine is operating;

compressing the oxidizable vapor phase mixture in the combustion chamber sufficiently for the vapor phase mixture to reach ignition temperature;

injecting a vapor phase fuel component into the combustion chamber, to mix with the oxidizable vapor mixture and thereby provide a vapor phase fuel mixture;

igniting the vapor phase fuel mixture to initiate an oxidation reaction which produces a vapor phase reaction product containing less than 20 percent by volume of the halogenated hydrocarbon compound; and discharging the vapor phase reaction product from the engine into the atmosphere.

2. The method of claim 1 in which the halogenated hydrocarbon compound is a chlorinated derivative of an aliphatic hydrocarbon, or an aromatic hydrocarbon.

* * * * *